(12) United States Patent
McLaughlin et al.

(10) Patent No.: US 6,269,161 B1
(45) Date of Patent: Jul. 31, 2001

(54) SYSTEM AND METHOD FOR NEAR-END TALKER DETECTION BY SPECTRUM ANALYSIS

(75) Inventors: Hugh J. McLaughlin, Mountain View; Linda J. King, San Jose; Tamara L. Logan, Cupertino, all of CA (US)

(73) Assignee: SignalWorks, Inc., Mountain View, CA (US)

( * ) Notice: Subject to any disclaimer, the term of this patent is extended or adjusted under 35 U.S.C. 154(b) by 0 days.

(21) Appl. No.: 09/315,774

(22) Filed: May 20, 1999

(51) Int. Cl.[7] .................................................. H04M 1/00
(52) U.S. Cl. ............................................ 379/406; 379/410
(58) Field of Search ................................. 370/286–291; 379/387–392, 399, 406–407, 409–411, 416, 420; 341/143–144

(56) References Cited

U.S. PATENT DOCUMENTS

| | | | |
|---|---|---|---|
| 4,807,173 | 2/1989 | Sommen et al. | 367/724.18 |
| 4,903,247 | 2/1990 | Van Gerwen et al. | 367/135 |
| 4,951,269 | 8/1990 | Amano et al. | 367/135 |
| 4,979,163 * | 12/1990 | Erving et al. | 379/390 |
| 5,164,727 * | 11/1992 | Zakhor et al. | 341/143 |
| 5,263,019 | 11/1993 | Chu | 370/32.1 |
| 5,305,307 | 4/1994 | Chu | 370/32.1 |
| 5,365,583 * | 11/1994 | Huang et al. | 379/390 |
| 5,526,426 | 6/1996 | McLaughlin | 379/411 |
| 5,598,468 | 1/1997 | Ammicht | 379/410 |
| 5,687,229 * | 11/1997 | Sih | 379/410 |
| 5,696,821 * | 12/1997 | Urbanski | 379/406 |
| 5,721,771 * | 2/1998 | Higuchi et al. | 379/389 |
| 5,732,134 | 3/1998 | Sih | 379/406 |
| 5,848,151 * | 12/1998 | Boudy et al. | 379/410 |
| 5,937,060 * | 8/1999 | Oh | 379/406 |
| 6,108,413 * | 8/2000 | Capman et al. | 379/390 |

\* cited by examiner

Primary Examiner—Curtis Kuntz
Assistant Examiner—George Eng
(74) Attorney, Agent, or Firm—Law Offices of Terry McHugh (57) ABSTRACT

A full duplex speakerphone system and a method of detecting a valid near-end talker component within an outgoing signal utilize a near-talker estimator that produces a near-talker energy estimate using a spectrum analysis. The near-talker energy estimate is indicative of the amount of the valid near-end talker component within the outgoing signal. Depending on the near-talker energy estimate, the system may attenuate the outgoing signal and/or incoming signal and adjust the filter process executed by an adaptive filter of the system in order to provide a clear voice communication between connected parties. In the preferred embodiment, the near-talker estimator operates with at least one processing unit to sample the outgoing signal that has been filtered, or "cancelled," of echo by an acoustic echo canceller of the system. The energy of the echo-cancelled outgoing signal is compared to an echo energy envelope to determine whether a certain portion of the echo-cancelled outgoing signal can be attributed to a valid near-end talker. The echo energy envelope represents a potential echo return of the incoming signal in a worst case scenario that has been increased by several factors, such as an external gain, ERLE, and a preselected uncertainty factor. The energy of the echo-cancelled outgoing signal and the echo energy envelope are examined with a noise floor estimate, which is derived from the echo-cancelled outgoing signal, to produce the near-talker energy estimate.

23 Claims, 5 Drawing Sheets

SYSTEM AND METHOD FOR NEAR-END TALKER DETECTION BY SPECTRUM ANALYSIS

TECHNICAL FIELD

The invention relates generally to voice communication systems that use a speakerphone to enable a hands-free voice communication. More specifically, the invention relates to acoustic echo cancellation techniques and full duplex speakerphone techniques that allow simultaneous reception and transmission of voice signals without significant switched loss or perceived echo.

DESCRIPTION OF THE RELATED ART

A full duplex speakerphone is a voice terminal that consists of at least one loudspeaker and at least one microphone, so that a hands-free voice communication is enabled. A full duplex speakerphone employs acoustic echo cancellation (AEC) techniques to permit simultaneous reception and transmission of speech without perceptible echo.

Figure 1:
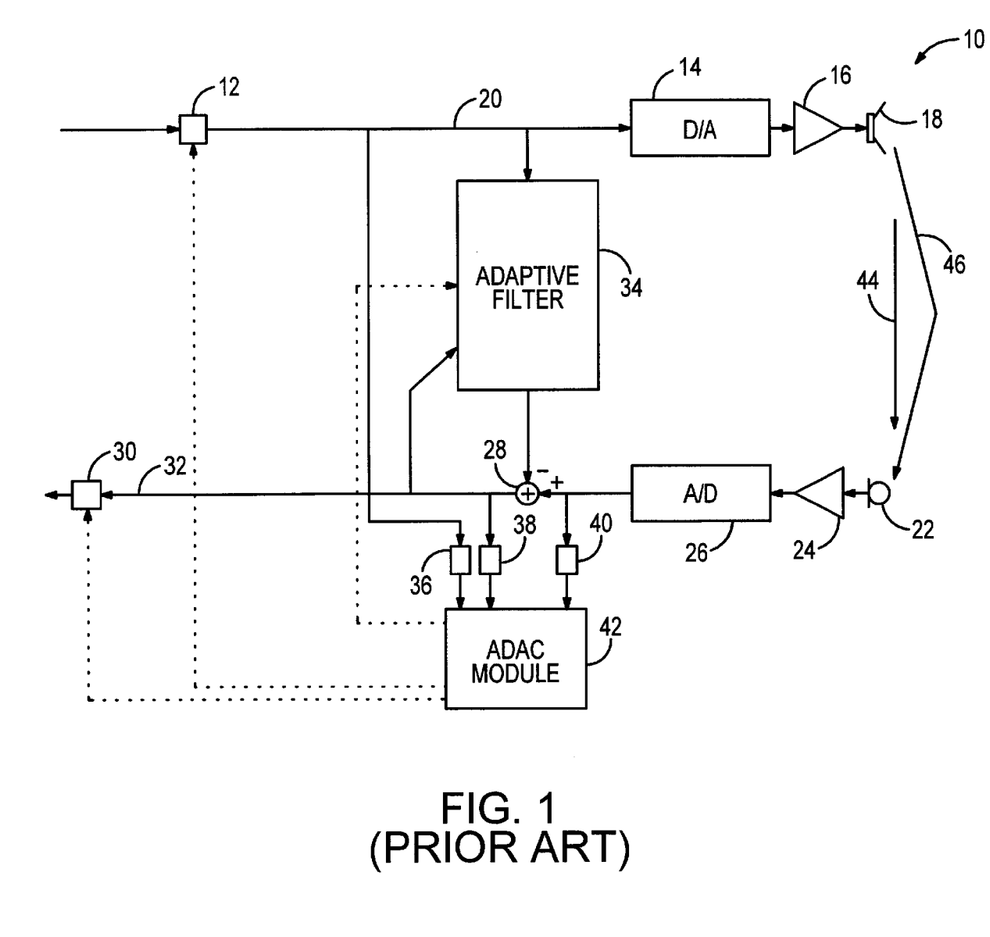
FIG. 1 is a block diagram of a conventional full duplex speakerphone system.

The fundamental structure of a typical full duplex speakerphone system is shown in FIG. 1. The full duplex speakerphone (FDS) system 10 includes an attenuator 12, a digital-to-analog (D/A) converter 14, an amplifier 16 and a loudspeaker 18 that are coupled in series on a receive path 20. The system also includes a microphone 22, a second amplifier 24, an analog-to-digital (A/D) converter 26, a subtraction unit 28 and a second attenuation processor 30 that are coupled in series on a send path 32. Situated between the receive path and the send path is an adaptive filter 34. The adaptive filter and the subtraction unit define an acoustic echo canceller. The system further includes three measurement processors 36, 38 and 40 that are each coupled to the receive or send path and an activity detection and control (ADAC) module 42. The measurement processor 36 is coupled to the receive path. The measurement processor 40 is coupled to the send path between the A/D converter and the subtraction unit, while the measurement processor 38 is coupled to the send path between the subtraction unit and the attenuation processor 30.

When an incoming digital signal from a far-end caller is received by the system 10, the received signal is transmitted through the attenuator 12 on the receive path 20. The received signal is then converted by the D/A converter 14 and amplified by the amplifier 16. The amplified analog signal is broadcast into a room by the loudspeaker 18. Depending on the acoustic characteristics of the room, an echo of the broadcast signal is propagated through various echo paths from the loudspeaker to the microphone 22, such as echo paths 44 and 46. The echo may be captured along with speech from the near-end caller by the microphone, and transmitted along the output path 32 as an outgoing analog signal. The outgoing signal is first amplified by the amplifier 24 and then converted into a digital format by the A/D converter 26.

Meanwhile, the adaptive filter 34 samples the original received digital signal and performs a convolution step, i.e., a computation of an estimated echo response, using the sampled signal as a reference. The estimated echo response is a predicted acoustic echo response of the system when used in a particular environment. A current estimate of the echo response is utilized to subtract echo components of the outgoing signal. The subtraction, or cancellation, of echo components is performed by the subtraction unit 28. After subtraction, this echo-cancelled outgoing signal is fed back to the adaptive filter 34 as an error signal that is utilized to dynamically adjust the filter coefficients that are used by the adaptive filter to execute the echo cancellation. The echo-cancelled outgoing signal is transmitted to the far-end caller via the attenuation processor 30. Since there will usually be some residual echo, the attenuation processor is typically used to reduce the residual echo to an acceptable level. The attenuation processor can take the form of a device commonly known as the center clipper.

The quality of the echo cancellation depends on the ability of an adaptation algorithm, which is utilized by the adaptive filter 14, to accurately model the true echo response. The true echo response is estimated by an adaptation process in which the error signal drives the adaptation algorithm to update the coefficients of the model, so that the error signal is driven toward zero, i.e., the echo-cancelled outgoing signal does not contain any detectable echo residue. However, the acoustic response of a room does not remain constant over time. For example, positional shifts of persons and/or the microphone in the room, or opening and closing of a door change the echo paths. The change in echo paths results in a new echo response that is inaccurately represented by the previously estimated echo model. Until the echo canceller can adapt to the new echo response, a substantial amount of echo may be transmitted to the far-end caller.

In addition to the echo cancellation, the system 10 is configured to determine if the signal activity is in one of four states: idle, far-end active, near-end active, or double-talk. If the far-end is active, the adaptive filter 34 should be allowed to further adapt, and the echo-cancelled outgoing signal may need to be suppressed by the attenuation processor 30. However, if the echo-cancelled outgoing signal is mostly composed of valid near-end talker speech, then the activity state is in either the near-end active or double-talk state. In such state, the adaptive filter should be disabled and the send path attenuation should be set close to unity. This determination of the activity state is executed by the ADAC module 42. The ADAC module examines the received signal, the original outgoing signal, and the echo-cancelled outgoing signal via the measurement processors 36, 38 and 40 in order to determine the composition of the echo-cancelled outgoing signal.

In general, the conventional detection algorithm utilized by the ADAC module 42 to differentiate between the near-end talker speech and residual echo is based on ad hoc detection techniques. Most conventional implementations teach that a correlation measure is computed between the received signal and the error signal, i.e., the echo-cancelled outgoing signal. The correlation measure may be by time domain correlation or by frequency domain correlation. The correlation algorithm seeks to determine how much the error signal matches the received signal that was broadcast by the loudspeaker. If the error signal looks substantially similar to the received signal, the send signal is considered to be composed of mostly residual echo and only far-end activity is declared. However, if the error signal looks significantly different from the received signal, the send signal is considered to be composed of substantial near-end talker speech and a double-talk condition is declared.

In practice, it is quite difficult to apply a correlation measure to compare the error signal against the received signal. Typically, the acoustic echo lasts much longer than the observation window, and further, the transfer function between the loudspeaker and the microphone is very complex. In fact, the echo signal may look substantially different from the received signal. In addition to signal distortion caused by the acoustic response of the room, the correlation is further complicated by the fact that the adaptive filter 34 may be well converged at certain frequencies, but not as well at other frequencies. Furthermore, in some speakerphone systems even the transfer function of the loudspeaker is not known with any significant degree of certainty.

Notwithstanding these difficulties, the identification of the signal component of valid near-end talker speech within the echo-cancelled outgoing signal is relatively easy when the adaptive filter has perfectly cancelled the echo. However, in real situations, the acoustic echo path can change much more quickly than the adaptive filter 34 can re-adapt. Until the adaptive filter can re-adapt, a significant amount of residual echo will be introduced to the outgoing signal. If this residual echo is incorrectly identified as a valid near-end talker speech, a significant amount of echo may be perceived by the far-end listener, and even worse, the adaptive filter will be inhibited from adapting. Potentially, the system 10 may enter a state in which the adaptive filter is not enabled because residual echo is mistaken by the system as a valid near-end talker speech. Consequently, further errors may continue to be made by the system until the control algorithm finally detects the repeated near-end speech events that occur simultaneously with the far-end speech events. In the meantime, a significant amount of unwanted echo will be transmitted to the far-end listener, decreasing the quality of the voice communication.

There exist known techniques to detect double-talk conditions, utilizing either subband or frequency domain adaptive filters. These techniques analyze the received signal as being a number of subbands or Discrete Fourier Transform (DFT) bins. Adaptation and convolution are performed on each one of these subbands or DFT bins. In general, the known techniques determine the approximate signal gain (loudspeaker to-microphone coupling) for each subband or bin, based on information from the adaptive filter to make the approximate signal gain measurement for each subband or bin. Given the gain for each subband or bin, a determination is made if there is a double-talk condition for each subband or bin. After detection of a double-talk condition, the following steps may be executed: (1) perform suppression for each subband or bin, usually by means of center-clipping; and (2) inhibit adaptation per each subband or bin.

A concern with these approaches is that the gain estimate for each subband or bin can vary dramatically in a matter of milliseconds. For example, if a person moves near the microphone and distorts the previously known echo path, the gain may suddenly change from a spectral null to a spectral peak. If the gain changes dramatically, it is quite possible for the detection algorithm to get stuck and persistently report an erroneous double-talk condition when, in fact, there is significant residual echo in that subband.

U.S. Pat. No. 5,732,134 to Sih describes a "double talk" detecting apparatus that analyzes the received signal and the original microphone signal into DFT bins in order to detect double talk. By comparing the received and microphone signals on a bin-by-bin basis and by removing the effect of the noise floor for each bin, the apparatus of Sih detects a "double talk" state for the whole band. The apparatus of Sih performs the DFT on the uncancelled original microphone signal, which has not been filtered of echo by an adaptive filter. In addition, the spectral noise estimate is derived from the same uncancelled microphone signal. A concern with the apparatus of Sih is that it uses a simple block-by-block computation of the receive signal DFT spectrum with no regard to the persistence of reverberant echo.

To avoid the said difficulties, what is needed is a system and a method that can reliably determine whether an outgoing signal is mostly of near-end talker signal or mostly of received signal echo in order to take an appropriate action to ensure a clear voice communication, without relying on a double-talk determination.

SUMMARY OF THE INVENTION

A full duplex speakerphone system and a method of detecting a valid near-end talker component within an outgoing signal utilize a near-talker estimator that produces a near-talker energy estimate using a spectrum analysis. The near-talker energy estimate is indicative of the amount of the valid near-end talker component within the outgoing signal. Depending on the near-talker energy estimate, the system may attenuate the outgoing signal and/or incoming signal and adjust the filtering process executed by an adaptive filter of the system in order to provide a clear voice communication between connected parties.

In the preferred embodiment, the near-talker estimator operates with at least one processing unit to sample the outgoing signal that has been filtered, or "cancelled" of echo by an acoustic echo canceller of the system. The near-talker estimator also samples an incoming signal. The sampled incoming and echo-cancelled outgoing signals are used to derive three energy spectrums. The first energy spectrum is the energy spectrum of the echo-cancelled outgoing signal. The second energy spectrum is the energy spectrum of an estimated noise floor, which is based on the energy spectrum of the echo-cancelled outgoing signal. The third energy spectrum is an echo energy envelope, which is based on the incoming signal. The echo energy envelope provides a threshold to determine with an adjustable degree of assurance whether a certain portion of the echo-cancelled outgoing signal can be attributed to the near-end talker, instead of noise or residual echo. The near-talker estimator examines these three energy spectrums and a computed spectrum of a preceding near-talker energy estimate in order to produce the current near-talker energy estimate.

The method of detecting a valid near-end talker component within an outgoing signal includes steps to generate, in parallel, the echo energy envelope, the energy spectrum of the echo-cancelled outgoing signal, and the noise floor energy spectrum. These spectrums are then further processed by the near-talker estimator to compute the near-talker energy estimate.

The steps to generate the echo energy envelope include a step at which the incoming signal is segmented into sampled data blocks by a first processing unit of the system. The sampling period is in the range of 6–20 milliseconds, so that the sampling window spans a portion of a typical speech phoneme. Next, Discrete Fourier Transform (DFT) is executed for each data block in accordance with one of a number of known variations of a Fast Fourier Transform (FFT) by the first processing unit. In an alternative arrangement, the segmentation and DFT may be executed as a by-product of the adaptive filter of the system. After the DFT step, a Hanning window function may be applied to the computed DFT element by a windowing unit of the near-talker estimator.

Next, the power is computed for each DFT bin by a power calculator of the near-talker estimator. For the purpose of this disclosure, the term "power" and "energy" are used interchangeably. These power values may be weighted, so that frequencies with more residual echo are weighted more heavily than frequencies with less residual echo. The results of the weighting are then passed through an envelope model filter of the near-talker estimator that creates an envelope for possible return echo, using a predefined model. For each bin, the model creates an envelope for the worst case echo return. The bin results are then transmitted to a first-in first-out (FIFO) buffer of the near-talker estimator to delay the bin results from the envelope model filter. Next, the maximum value for each bin is selected by surveying each element in the FIFO buffer. The results from the FIFO buffer are transmitted to a multiplying unit and are multiplied by the following factors: (1) a known or conservatively measured external gain (the nominal coupling gain between the loudspeaker and the microphone) with reference points between the incoming signal and the echo-cancelled outgoing signal; (2) a conservatively measured value for the echo canceller return loss enhancement (commonly known as ERLE); and (3) an uncertainty factor. The uncertainty factor may be an experimentally determined factor that results in good near-talker estimates with low probability of false indications. In the simplest implementation, these factors are scalars. However, this concept can easily be extended from a single scalar value to a vector to achieve a degree of optimization where there is some known variance in performance across the bins. The resulting vectors from the multiplying unit represent the echo energy envelope.

The steps to generate the energy spectrum of the echo-cancelled outgoing signal and the noise floor energy spectrum include segmenting the echo-cancelled outgoing signal into sampled data blocks and performing DFT by a second processing unit. Next, a Hanning window may be applied to the computed DFT elements by a second windowing unit to suppress spectral leakage between the DFT bins. The power is then computed for each DFT bin by a second power calculator. These computed power values represent the energy spectrum of the echo-cancelled outgoing signal. The computed power values from the second power calculator are further processed to derive the noise floor energy spectrum. The bin power vector of the outgoing signal power spectrum is first averaged by an averaging unit of the near-talker estimator for each frequency bin. Next, the noise floor power estimate is computed by a noise floor estimator of the near-talker estimator using a conventional noise floor estimation technique.

After computing the echo energy envelope, the energy spectrum of the echo-cancelled outgoing signal, and the noise floor energy spectrum, the method proceeds to compute the near-talker energy estimate. The bin values of the three energy spectrums are transmitted to a comparator of the near-talker estimator. The comparator outputs the maximum value for each bin from the following values: (1) the noise floor power estimate; (2) the decayed near-talker power estimate; and (3) the outgoing signal power minus the echo energy envelope plus the noise floor power estimate.

In one embodiment, these maximum values of the bins are summed by a power summation unit of the near-talker estimator. The summed value is then filtered by a track-up average-down filter to output a single near-talker power estimate. The near-talker power estimate is then transmitted to an activity detection and control (ADAC) module of the system in order for the ADAC module to take appropriate action in response to the near-talker power estimate. The near-talker power estimate is compared to a level of residual echo. The residual echo is estimated by predicting the echo cancelling performance of the adaptive filter of the system. If the near-talker power estimate is substantially greater than the residual echo estimate, the ADAC module directs an attenuation processor on a send path to allow the echo-cancelled outgoing signal to pass with little or no attenuation. However, if the residual echo estimate is comparable to or substantially greater than the near-end talker estimate, the ADAC module may inhibit the adaptive filter from adapting, or decrease the step size being used by the adaptive filter. In addition, the ADAC module may direct the attenuation processor on the send path to substantially suppress the echo-cancelled outgoing signal, so that no audible echo will be perceived by a person at the far-end. Furthermore, the ADAC module may direct an attenuator on the receive path to suppress the received signal in order to reduce the amount of echo that is introduced into the outgoing signal.

In alternative embodiments, the method and the system may be modified to derive multiple estimates, instead of a single total near-talker power estimate. As an example, a plurality of echo energy envelopes may be computed using different uncertainty factors. For each echo energy envelope, a unique near-talker power estimate would be produced. These near-talker estimates will vary with respect to the reliability of the estimates. As another example, a near-talker power estimate may be derived for a particular subset of bins, such as a first estimate for the low frequencies and a second estimate for the high frequencies. Some optimization in performance may be achieved by taking advantage of different masking properties of low or high frequencies. These multiple estimates can then be used by the ADAC module to control the final outgoing signal that is transmitted to the far-end party.

DETAILED DESCRIPTION

Figure 2:
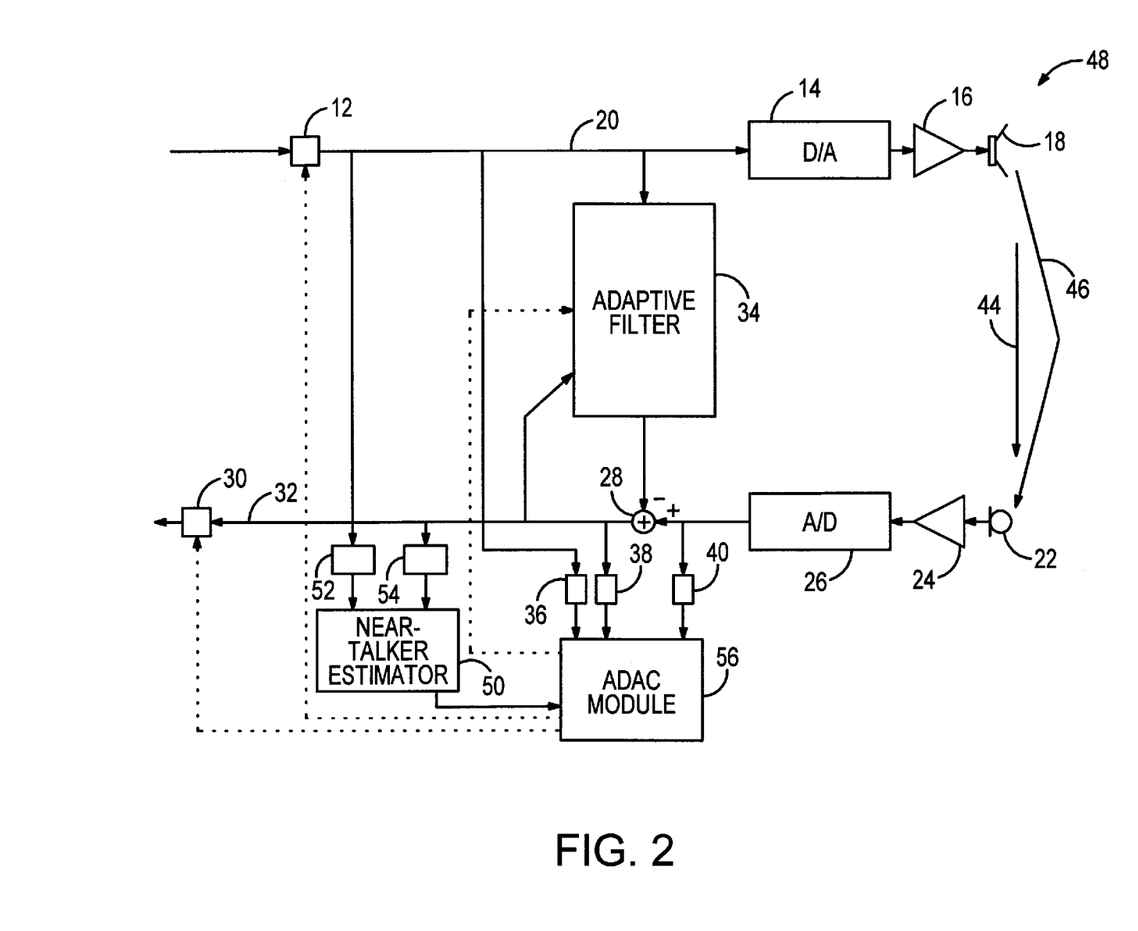
FIG. 2 is a block diagram of a full duplex speakerphone system having a near-talker estimator in accordance with the present invention.

With reference to FIG. 2, a full duplex speakerphone system 48 having a near-talker estimator 50 and associated processing units 52 and 54 in accordance with the invention is shown. The system also includes an activity detection and control (ADAC) module 56 that is operatively coupled to the near-talker estimator. Other components of the system are conventional components that are present in a conventional full duplex speakerphone system, such as the system 10 of FIG. 1. Therefore, these conventional components will be identified with the same reference numerals of FIG. 1. The system 48 includes the attenuator 12, the digital-to-analog (D/A) converter 14, the amplifier 16 and the loudspeaker 18 that are coupled in series on the receive path 20. The system also includes the microphone 22, the second amplifier 24, the analog-to-digital (A/D) converter 26, the subtraction unit 28 and the attenuation processor 30 that are coupled in series on the send path 32. Furthermore, the system includes the adaptive filter 34 and the measurement processors 36, 38 and 40. The adaptive filter and the subtraction unit define an acoustic echo canceller of the system 48.

The inclusion of the near-talker estimator 50 allows the system 48 to determine whether an echo-cancelled outgoing signal mostly contains a near-talker signal or an echo of the received signal that was captured by the microphone 22. The near-talker estimator utilizes a spectral analysis to estimate the energy or power of the near-talker signal. This near-talker estimate is then transmitted to the ADAC module 56 for comparison with a residual echo estimate computed by the ADAC module. Depending on the result of the comparison, the system takes an appropriate action to provide clear voice communication. If the near-end talker estimate is substantially greater than the residual echo estimate, the ADAC module directs the attenuation processor 30 on the send path 32 to allow the echo-cancelled outgoing signal to pass with little or no attenuation. However, if the residual echo estimate is comparable to or substantially greater than the near-end talker estimate, the ADAC module may inhibit the adaptive filter 34 from adapting, or may increase the step size being used by the adaptive filter. In addition, the ADAC module may direct the attenuation processor 30 to substantially suppress the echo-cancelled outgoing signal, so that no audible echo will be perceived by a person at the far-end. Furthermore, the ADAC module may direct the attenuator 12 on the receive path to suppress the received signal in order to reduce the amount of echo that is introduced into the outgoing signal by the signal coupling between the loudspeaker 18 and the microphone 22.

Figure 3:
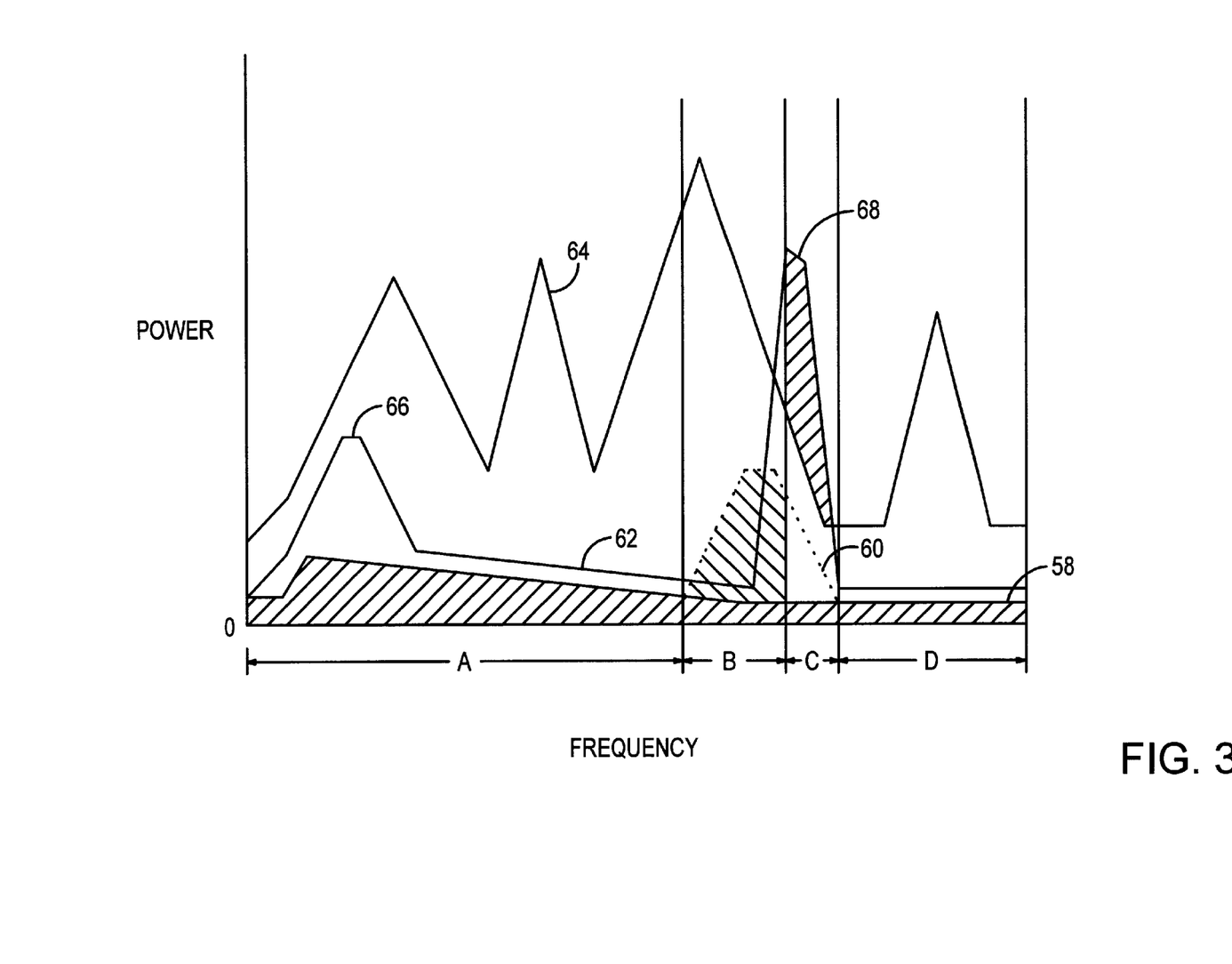
FIG. 3 is a graphical representation of different power spectrums that are used by the system of FIG. 2 to compute a near-talker power estimate.

The spectral analysis that is performed by near-talker estimator 50 of the system 48 will be described with an illustrative graph, shown in FIG. 3. The graph of FIG. 3 shows four spectral distribution curves 58, 60, 62 and 64 that are plotted with respect to power and frequency for a given moment of time. The curve 58 represents the noise floor estimate, while the curve 60 represents the decayed near-talker estimate. In general, the decayed near-talker estimate is a fraction of the previous estimate of the near-end talker. The curve 62 represents the outgoing signal captured by the microphone that has been echo-cancelled by the adaptive filter 34 and the subtraction unit 28 of the system 48. The curve 64 represents an echo envelope that is based on the received signal. The echo envelope provides an upper limit, or a threshold, to determine whether the outgoing signal includes a near-talker signal component. If the outgoing signal is less than the echo envelope, the outgoing signal is assumed to not include any near talker signal component. However, if the outgoing signal is greater than the echo envelope, the outgoing signal is then assumed to include the near-talker signal component. In the graph of FIG. 3, the outgoing signal energy curve 62 has two peaks 66 and 68. The first peak 66 lies below the echo envelope. Thus, this peak is ignored as not being a result of a near-talker signal component. The second peak 68, however, rises above the echo envelope. Thus, a portion of this peak will be used to compute the near-talker estimate.

In one embodiment, the near-talker estimator 50 generates a single near-talker estimate for the entire spectrum being analyzed. In this embodiment, the near-talker estimator examines the different signals in order to derive the single near-talker estimate, which is the area of the crosshatched regions, shown in FIG. 3. The graph of FIG. 3 has been divided into four sections A, B, C and D to illustrate how the near-talker estimator will compute the single near-talker estimate. In section A, the outgoing signal curve 62 lies below the echo envelope curve 64. In such situations, only the noise floor estimate curve 58 will be taken into consideration for the near-talker estimate computation. In section B, the outgoing signal curve also lies below the echo envelope curve. However, the decayed near-talker estimate curve 60 lies above the noise floor estimate curve. In this situation, the decayed near-talker estimate curve is considered for the near-talker estimate. In section C, the outgoing signal curve lies above the echo envelope curve. In such situations, the portion of the outgoing signal that is greater than the echo envelope and the noise floor estimate are considered for the near-talker estimate. Note that in the graph of FIG. 3, section C begins at a point where the difference between the outgoing signal and the echo envelope is greater than the difference between the decayed near-talker estimate and the noise floor estimate. This is due to the fact that the near-talker estimator only considers the outgoing signal when it is significantly greater than the echo envelope, i.e., when the difference between the outgoing signal and the echo envelope is greater than the difference between the decayed near-talker estimate and the noise floor estimate. Section D is identical to section A with respect to the amount of power that should be contributed toward the single near-talker estimate. The cross-hatched areas define the portions of the noise floor estimate, the decayed near-talker estimate, and/or the outgoing signal that are summed by the near-talker estimator to compute the single near-talker energy estimate.

Figure 4:
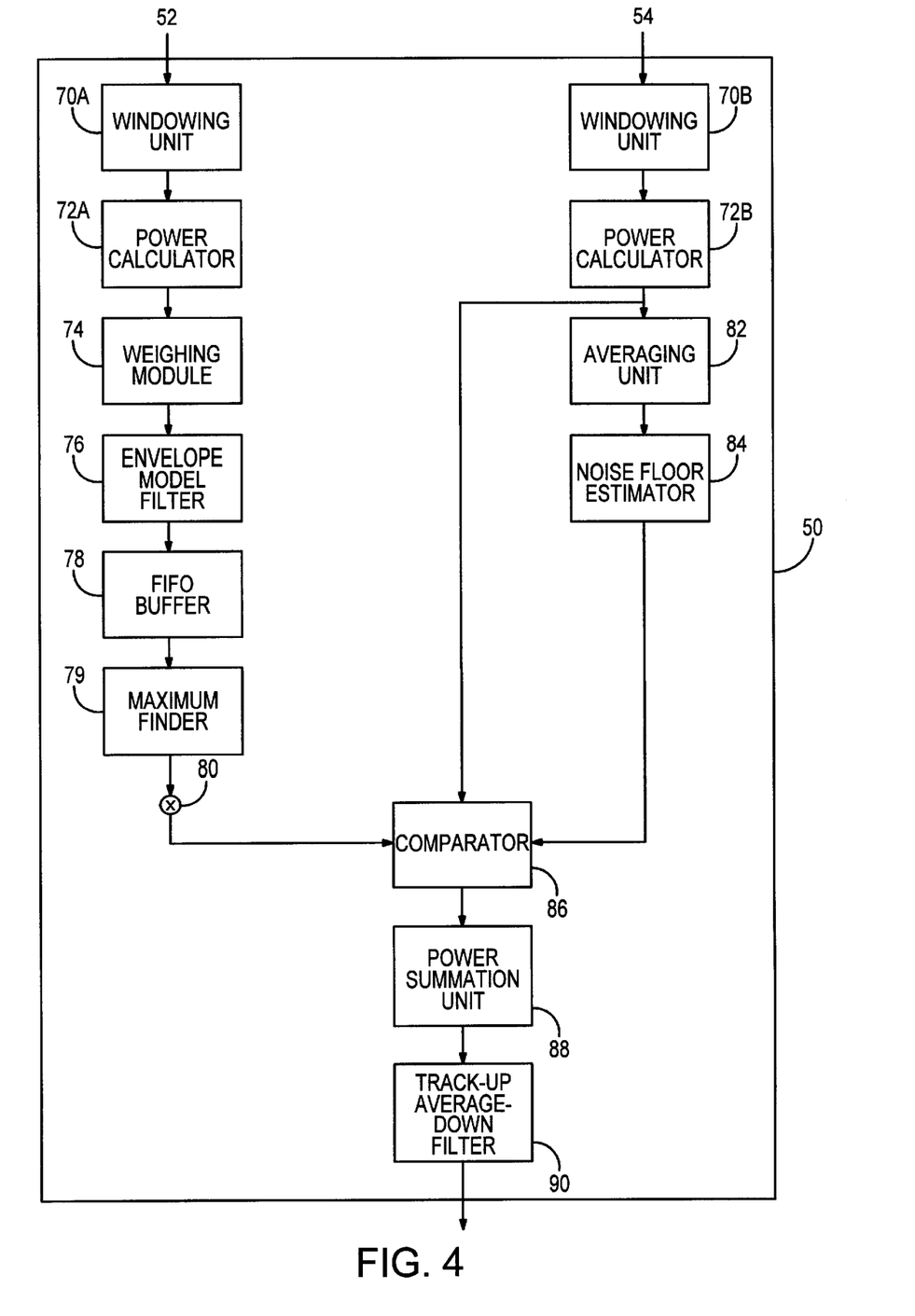
FIG. 4 is a block diagram of the components of the near-talker estimator in accordance with the invention.
Figure 5:
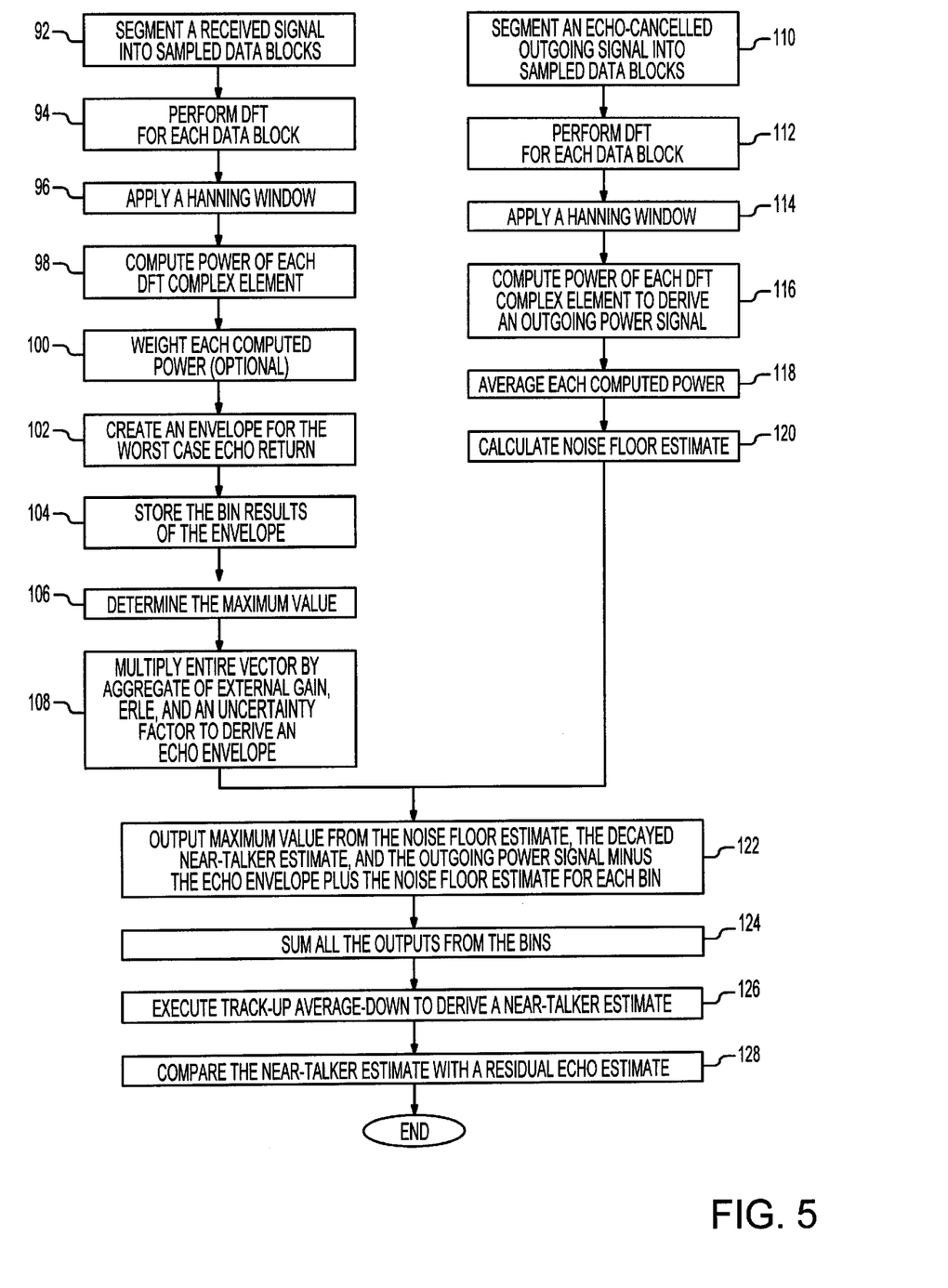
FIG. 5 is a flow diagram of a method of detecting a valid near-end talker component within an echo-cancelled outgoing signal in accordance with the invention.

A method of detecting a valid near-end talker component within an echo-cancelled outgoing signal in the full duplex speakerphone system 48 in accordance with the invention is illustrated by a flow diagram, shown in FIG. 5. This method is primarily executed by the near-talker estimator 50. Therefore, the method will be described with reference to the components of the near-talker estimator, which are shown in FIG. 4. The near-talker estimator includes a windowing unit 70A and a power calculator 72A that operate to compute the energy of the incoming signal on the receive path 20 for a defined frequency spectrum, e.g., 0–4 kilohertz, and a second windowing unit 70B and a second power calculator 72B that operate to compute the energy of the echo-cancelled outgoing signal for the defined frequency spectrum. The near-talker estimator also includes a weighting module 74, an envelope model filter 76, a first-in first-out (FIFO) buffer 78, a maximum finder 79 and a multiplying unit 80 that operate with the widowing unit 70A and the power calculator 72A to compute the echo energy envelope for the defined frequency spectrum. In addition, the near-talker estimator includes an averaging unit 82 and a noise floor estimator 84 that also operate with the second windowing unit 70B and the second power calculator 72B to generate the noise floor power estimate for the defined frequency spectrum. The remaining components of the near-talker estimator are a comparator 86, a power summation unit 88 and a track-up average-down filter 90 that operate to derive the single near-talker power estimate from the computed energy of the outgoing signal, the noise floor power estimate, the echo energy envelope, and the decayed near-talker estimate.

With reference to FIG. 5, the method of detecting a valid near-end talker component within an echo-cancelled outgoing signal begins at step 92, at which an incoming signal on the receive path 20 is segmented into sampled data blocks by the processing unit 52 of the system 48. The sampling period is in the range of 6-20 milliseconds, so that the sampling window spans a portion of a typical speech phoneme. Next, at step 94, Discrete Fourier Transform (DFT) is executed for each data block in accordance with one of a number of known variations of a Fast Fourier Transform (FFT) by the processing unit 52. In an alternative arrangement, the segmentation and DFT may be executed by the adaptive filter 34. In such arrangements, the processing unit 52 will no longer be needed by the system 48. At step 96, a window function is applied to the computed DFT elements by the windowing unit 70A of the near-talker estimator 50 to suppress spectral leakage between the DFT bins. However, the windowing step 96 may be omitted if the leakage is minimal. For example, the leakage should be minimal for a typical subband filter bank design. Thus, the windowing step may be omitted for a case when the spectral results were from a subband filter bank. Preferably, the window function is a Hanning window function. For most DFT formulations, this consists of performing a three-point moving average using coefficients: (0.25, 0.5, 0.25). For some DFT formulations this may require an alternate set of coefficients: (−0.25, 0.5, −0.25). This frequency domain windowing technique is almost as efficient as performing the windowing function in the time domain. The very low frequency bins (including the DC bin) and the very high frequency bins can be eliminated to conserve memory without loss in performance.

After the windowing step 96, the power is computed for each DFT bin by the power calculator 72A, at step 98. This computation is:

$$power = X^2 + Y^2,$$

where the bin is represented by the complex number X+iY. For the purpose of this disclosure, the terms "power" and "energy" are used interchangeably. At an optional step 100, the results of the received signal power computation are weighted, so that frequencies with more residual echo are weighted more heavily than frequencies with less residual echo. The optional step 100 is applicable in a situation where the transfer function between the loudspeaker 18 and the microphone 22 is known or where it is known that there are certain frequencies, such as very low frequencies, causing problems with respect to echo.

At step 102, the results of the weighting are then passed through the envelope model filter 76 that creates an envelope for possible return echo, using a predefined model. This model accounts for the substantial persistence of echo as it reverberates through a room in which the loudspeaker 18 has broadcast the incoming signal. For each bin, the model creates an envelope for the worst case echo return. In general, the return echo is composed of: (1) echo that is substantially direct from the loudspeaker to the microphone and; (2) indirect echo that is substantially caused by reflections off of walls and surfaces throughout the room. If the return echo is known to be composed of mostly indirect echo, it is not necessary to model the direct echo path. However, in general, the indirect echo path must be modeled because the decay of indirect echo reflections is only about 1 dB per 10 milliseconds for a typical room. If this decayed echo is not modeled, it is possible for lingering reverberations to be mistaken for valid near-end speech.

An effective technique for modeling the aggregate of the direct and indirect echo is described below using a C-language pseudo-code:

RDirect[i]=TrackUpAveDown(RDirect[i], &RWeighted[i], Cdirect);

RIndirect[i]=TrackUpAveDown(RIndirect[i], &RWeighted[i], Cindirect);

REnv[i]=A*RDirect[i]+B*RIndirect[i];

where:
RDirect[i] is the direct echo envelope;
RIndirect[i] is the indirect echo envelope;
REnv[i] is the aggregate echo envelope;
A is the portion of the direct echo that makes up the aggregate echo envelope; and
B is the portion of the indirect echo that makes up the aggregate echo envelope.

The function TrackUpAveDown is described by:
void TrackUpAveDown(float input, float*state, float coefficient)
{
    *state=*state+coefficient*(input−*state);
    if(input>*state )
        *state=input;
}

This TrackUpAveDown function is a simple nonlinear filter that tracks the input as it is ascending and averages the input with the current filter state as the input is declining.

In case there is uncertainty regarding the position of the microphone 18 relative to the loudspeaker 22, it may be necessary to create a delay aspect to the envelope to account for this uncertainty. This can be performed by delaying the bin results in a FIFO buffer. Therefore, at step 104, the bin results are stored in the FIFO buffer 78 to delay the bin results from the envelope model filter 76. Next, at step 106, the maximum value for each bin is selected by surveying each bin of same index for each vector in the FIFO buffer by the maximum finder 79.

At step 108, the results from the FIFO buffer are transmitted to the multiplying unit and are multiplied by the following factors: (1) a known or conservatively measured external gain (the nominal coupling gain between the loudspeaker 18 and the microphone 22) with reference points between the received signal and the echo-cancelled outgoing signal; (2) a conservatively measured value for the echo canceller return loss enhancement (commonly known as ERLE), which is usually a number less than unity, but is limited to a minimum value that is practically guaranteed to be true all the time; and (3) an uncertainty factor. The uncertainty factor may be an experimentally determined factor that results in good near-talker estimates with low probability of false indications. The uncertainty factor is usually greater than unity. The resulting vectors, which represent the echo energy envelope, are transmitted to the comparator 86. Although these factors are described as scalar numbers, this concept can easily be extended from a single scalar value to a vector to achieve a degree of optimization where there is some known variance in performance across the bins.

Executed in parallel to steps 92–108, an echo-cancelled outgoing signal is processed at steps 110–120 to derive an outgoing signal power spectrum and a noise floor power estimate. Similar to the processing of the received signal, the echo-cancelled outgoing signal on the send path is segmented into sampled data blocks and is transformed using DFT by the processing unit 54, at steps 110 and 112, respectively. Next, at step 114, a window function is applied to the computed DFT elements by the windowing unit 70B of the near-talker estimator 50 to suppress spectral leakage between the DFT bins. Preferably, the window function is a Hanning window function. At step 116, the power is computed for each DFT bin by the power calculator 72B. These computed power values represent the outgoing signal power spectrum. The outgoing signal power spectrum is transmitted to the comparator 86 to be processed along with the computed echo energy envelope.

In addition to being transmitted to the comparator, the outgoing signal power spectrum is transmitted to the averaging unit 82 of the near talker estimator 50 for further processing to derive the noise floor power estimate. At step 118, the bin power vector of the outgoing signal power spectrum is averaged by the averaging unit 82 for each frequency bin. Next, at step 120, the noise floor power estimate is computed by the noise floor estimator using a conventional noise floor estimation technique. As an example, the noise floor estimate for each bin may be computed by the following pseudo-code procedure:

```
static variables:
   NoiseEst;
   UpDelta;
   Down Factor;
function NoiseFloorEstimate(SinputPower)
{
   if(inputPower >NoiseEst)
      NoiseEst=NoiseEst+UpDelta;
   else
      NoiseEst=NoiseEst+DownFactor*(inputPower
         −NoiseEst);
   return NoiseEst;
}
```

In this procedure, the noise level estimate floats up slowly when the input power is greater than the current noise estimate. However, when the input power is less than the current noise level estimate, the estimate goes downward much faster and nearly tracks the level of the inputPower as successively lower powers are reported. The computed noise floor power estimate is transmitted to the comparator 86. The comparator is now ready to compute the near-talker power estimate for each bin.

At step 122, the comparator 86 outputs the maximum value for each bin from the following values: (1) the noise floor power estimate; (2) the decayed near-talker power estimate; and (3) the outgoing signal power minus the echo energy envelope plus the noise floor power estimate. Next, at step 124, these maximum values of the bins are summed by the power summation unit 88. The summed value is then filtered by the track-up average-down filter 90 to output the single near-talker power estimate, at step 126.

The near-talker power estimate is transmitted to the ADAC module 56 in order for the ADAC module to take appropriate action in response to the near-talker power estimate. At step 128, the near-talker power estimate is compared to a level of residual echo. The residual echo is estimated by predicting the echo cancelling performance of the adaptive filter 34. If the near-talker power estimate is substantially greater than the residual echo estimate, the ADAC module directs the attenuation processor 30 to allow the echo-cancelled outgoing signal to pass with little or no attenuation. However, if the residual echo estimate is comparable to or substantially greater than the near-end talker estimate, the ADAC module may inhibit the adaptive filter from adapting, or decrease the step size being used by the adaptive filter. In addition, the ADAC module may direct the attenuation processor 30 on the send path to substantially suppress the echo-cancelled outgoing signal, so that no audible echo will be perceived by a person at the far-end. Furthermore, the ADAC module may direct the attenuator 12 on the receive path to suppress the received signal in order to reduce the amount of echo that is introduced into the outgoing signal.

In alternative embodiments, the method and the system may be modified to derive multiple estimates, instead of a single total near-talker power estimate. As an example, a plurality of echo energy envelopes may be computed using different uncertainty factors. For each echo energy envelope, a unique near-talker power estimate would be produced. These near-talker estimates will vary with respect to the reliability of the estimates. As another example, a near-talker power estimate may be derived for a particular subset of bins, such as a first estimate for the low frequencies and a second estimate for the high frequencies. Some optimization in performance may be achieved by taking advantage of different masking properties of low or high frequencies. These multiple estimates can then be used by the ADAC module to control the final outgoing signal that is transmitted to the far-end party.

What is claimed is:

1. A method of detecting a near-end signal component within an echo-filtered outgoing signal in an acoustic echo canceller system comprising steps of:
   receiving an incoming signal from a far-end source;
   transmitting an initial outgoing signal from a near-end source;
   adaptively filtering an echo of said incoming signal within said initial outgoing signal to produce said echo-filtered outgoing signal; and
   estimating an amount of said near-end signal component within said outgoing echo-filtered signal that originated from said near-end source by performing Fourier Transform of said echo-filtered outgoing signal and said incoming signal for a defined frequency spectrum, said step of estimating including:
   (1) examining an energy distribution of said echo-filtered outgoing signal using a threshold energy distribution that is based on said incoming signal for said defined frequency spectrum;
   (2) computing threshold energy values of said threshold energy distribution for said defined frequency spectrum;
   (3) computing energy values of said energy distribution of said echo-filtered outgoing signal for said defined frequency spectrum;
   (4) estimating an energy of a noise floor for said defined frequency spectrum; and
   (5) selecting near-end energy estimate values for frequency components of said defined frequency spectrum, each of said near-end energy estimate values being the largest frequency-corresponding value of (a) said noise floor, and (b) said energy distribution of said echo-filtered outgoing signal minus said threshold energy distribution.

2. The method of claim 1 wherein said step of computing said threshold energy values includes a step of modeling said incoming signal to create an envelope for a potential return echo that is contained in said outgoing echo-filtered signal, including taking into account acoustic components of said potential return echo due to reverberations.

3. The method of claim 2 wherein said step of computing said threshold energy values further includes a step of delaying said envelope derived from said step of modeling said incoming signal to ensure said envelope takes into account a potential delayed return echo of said incoming signal.

4. The method of claim 3 wherein said step of delaying said envelope includes steps of:
   storing modeled values of said envelope in a first-in first out buffer; and
   selecting a maximum value for each of said modeled values by surveying corresponding modeled values from said envelope and at least another computed envelope.

5. The method of claim 1 wherein said step of computing said threshold energy values includes taking into account an external gain of said acoustic echo canceller system, said external gain being a coupling gain between a speaker and a microphone that are both located at said near-end source in which said incoming signal and said initial outgoing signal are used as references.

6. The method of claim 1 wherein said step of computing said threshold energy values includes taking into account a measured echo canceller return loss enhancement of said acoustic echo canceller system.

7. The method of claim 1 wherein said step of estimating said amount of said near-end signal component further includes a step of summing said near-end energy estimate values of said frequency segments to derive a single energy estimate value for said near-end signal component within said outgoing echo-filtered signal.

8. The method of claim 7 further comprising a step of comparing said single energy estimate value of said near-end signal component with a residual echo estimate, said residual echo estimate being derived from a predicted echo cancelling performance of said acoustic echo canceller system.

9. The method of claim 1 wherein said step of estimating said amount of said near-end signal component further includes a step of summing said maximum values of said frequency segments for selected frequency ranges within said defined frequency spectrum to derive multiple energy estimate values for said near-end signal component within said outgoing echo-filtered signal.

10. The method of claim 1 wherein said step of computing said threshold energy values includes a step of applying a windowing function to suppress spectral leakage.

11. The method of claim 10 wherein said step of applying a windowing function includes performing a three-point weighted moving average.

12. An acoustic echo canceller system comprising:
a receive path connected to receive an incoming signal from a far-end source;
a send path connected to transmit an initial outgoing signal from a near-end source;
echo-cancelling means operatively associated with said receive path and said send path to adaptively filter an echo of said incoming signal within said initial outgoing signal to produce an echo-filtered signal;
a near-end signal estimator coupled to said receive path and said send path that generates an energy estimate of a near-end signal component within said echo-filtered signal that originated from said near-end source, said near-end signal estimator being configured to perform Fourier Transformations so as to spectrally examine said echo-filtered signal and said incoming signal to generate said energy estimate, said near-end signal estimator including:
(1) a means for generating threshold energy values of a threshold energy distribution that is based on said incoming signal, said threshold energy distribution being used by said near-end signal estimator to compare an energy distribution of said echo-filtered signal in order to determine a portion of said echo-filtered signal that is attributable to said near-end signal component;
(2) a means for estimating an energy of a noise floor to derive a noise floor estimate and a means for computing an energy of said echo-filtered signal, said noise floor estimate and said computed energy of said echo-filtered signal being utilized to derive said energy estimate of said near-end signal component within said echo-filtered signal; and
(3) a processing unit that is operatively coupled to said means for generating said threshold energy values, said means for estimating said energy of said noise floor, and said means computing said energy of said echo-filtered signal, said processing unit being configured to output near-end energy values that represent said energy estimate of said near-end signal component within said echo-filtered signal for a defined spectral range, each of said near-end energy values output by said processing unit being a maximum value of selected values for a particular frequency segment of said defined spectral range, said selected values being (a) said noise floor estimate, and (b) said energy of said echo-filtered signal minus a corresponding threshold energy value, said near-end energy values being dependent on said threshold energy values, said noise floor estimate, and said energy of said echo-filtered signal; and
controlling means operatively associated with said near-end signal estimator and said echo-cancelling means for adjusting said echo-filtered signal for transmission in response to said energy estimate.

13. The system of claim 12 wherein said means for generating said threshold energy values includes a means for modeling said incoming signal to create an envelope for a potential return echo that may be contained in said outgoing echo-filtered signal, said means for modeling being configured to take into account acoustic components of said potential return echo due to reverberations.

14. The system of claim 13 wherein said means for generating said threshold energy values further includes a means for delaying said envelope derived from said means of modeling said incoming signal, said means for delaying said envelope being configured to selected a maximum value for each of modeled values of said envelope by surveying corresponding modeled values from said envelope and at least another computed envelope.

15. The system of claim 12 wherein said means for generating said threshold energy values includes a multiplying element that introduces selected factors to derive said threshold energy values.

16. The system of claim 15 wherein said multiplying element is configured to factor in an external gain of said system, said external gain being a coupling gain between said receive path and said send path in which said incoming signal and said initial outgoing signal are used as references.

17. The system of claim 15 wherein said multiplying element is configured to factor in a measured echo canceller return loss enhancement to derive said threshold energy values.

18. A method of estimating an amount of a near-end signal component within an echo-cancelled outgoing signal in an acoustic echo canceller system comprising steps of:
sampling an incoming signal on a receive path of said acoustic echo canceller system;
generating an initial outgoing signal from a near-end source;
adaptively canceling an echo of said incoming signal within said initial outgoing signal to produce said echo-cancelled outgoing signal; and
spectrally analyzing an energy distribution by performing discrete Fourier Transform of said echo-cancelled outgoing signal with an echo envelope energy distribution for a defined frequency spectrum in order to determine a portion of said energy distribution that is attributable to said near-end signal component, said echo envelope energy distribution being based on said sampled incoming signal;

computing an energy estimate value of said near-end signal component for each frequency segment of said defined frequency spectrum at least partially based on said spectral analysis of said energy distribution utilizing discrete Fourier Transform, said energy estimate value representing said amount of said near-end signal component within said echo-cancelled outgoing signal for a particular frequency segment;

computing echo envelope energy values of said echo envelope energy distribution for said defined frequency spectrum that are derived from said incoming signal; and computing an estimated energy of a noise floor for said defined frequency spectrum, said estimated energy being derived from said echo-cancelled outgoing signal, including selecting a maximum frequency corresponding value from (a) said estimated energy of said noise floor, (b) a decayed previously computed energy estimate of a preceding near-end signal component, and (c) said energy distribution of said echo-cancelled outgoing signal plus said estimated energy of said noise floor minus said echo envelope energy distribution.

19. The method of claim 18 wherein said step of computing said echo envelope energy values includes a step of modeling said incoming signal to create an envelope for a potential return echo that may be contained in said outgoing echo-filtered signal, including taking into account acoustic components of said potential return echo due to reverberations.

20. The method of claim 19 wherein said step of computing said echo envelope energy values further includes steps of:

delaying modeled values of said envelope; and selecting a maximum value for each of said modeled values by surveying corresponding modeled values from said envelope and at least another computed envelope.

21. The method of claim 18 wherein said step of computing said echo envelope energy values includes increasing said corresponding energy value by a factor, said factor being an external gain of said acoustic echo canceller system.

22. The method of claim 18 wherein said step of computing said echo envelope energy values includes increasing said corresponding energy value by a factor, said factor being a measured echo canceller return loss enhancement of said acoustic echo canceller system.

23. An acoustic echo canceller system comprising:

a receive path connected to receive an incoming signal from a far-end source;

a send path connected to transmit an initial outgoing signal from a near-end source;

echo-cancelling means operatively associated with said receive path and said send path to adaptively filter an echo of said incoming signal within said initial outgoing signal to produce an echo-filtered signal;

a near-end signal estimator coupled to said receive path and said send path that generates an energy estimate of a near-end signal component within said echo-filtered signal that originated from said near-end source, said near-end signal estimator being configured to perform Fourier Transformations so as to spectrally examine said echo-filtered signal and said incoming signal to generate said energy estimate, said near-end signal estimator including:

(1) a means for generating threshold energy values of a threshold energy distribution that is based on said incoming signal, said threshold energy distribution being used by said near-end signal estimator to compare an energy distribution of said echo-filtered signal in order to determine a portion of said echo-filtered signal that is attributable to said near-end signal component;

(2) a means for estimating an energy of a noise floor to derive a noise floor estimate and a means for computing an energy of said echo-filtered signal, said noise floor estimate and said computed energy of said echo-filtered signal being utilized to derive said energy estimate of said near-end signal component within said echo-filtered signal; and (3) a processing unit that is operatively coupled to said means for generating said threshold energy values, said means for estimating said energy of said noise floor, and said means computing said energy of said echo-filtered signal, said processing unit being configured to output near-end energy values that represent said energy estimate of said near-end signal component within said echo-filtered signal for a defined spectral range, said near-end energy values being dependent on said threshold energy values, said noise floor estimate, and said energy of said echo-filtered signal;

controlling means operatively associated with said near-end signal estimator and said echo-cancelling means for adjusting said echo-filtered signal for transmission in response to said energy estimate; and a summing element coupled to said processing unit and said controlling means, said summing element being configured to sum said near-end energy values to derive a single summed value that represents said energy estimate of said near-end signal component within said echo-filtered signal, said single summed value being used by said controlling means to adjust said echo-filtered signal.

* * * * *